J. P. SMITH.
Corn Sheller.

No. 28,784. Patented June 19, 1860.

Witnesses:
R. H. Osgood
C. N. Smith

Inventor:
J. P. Smith
By his atty
J. L. Brown

UNITED STATES PATENT OFFICE.

J. P. SMITH, OF HUMMELSTOWN, PENNSYLVANIA.

CORN-SHELLER.

Specification of Letters Patent No. 28,784, dated June 19, 1860.

*To all whom it may concern:*

Be it known that I, JEREMIAH P. SMITH, of Hummelstown, in the county of Dauphin and State of Pennsylvania, have invented a new and useful Improvement in Corn-Shellers; and I do hereby declare that the following is a full and exact description thereof, reference being had to the accompanying drawings, making part of this specification.

Figure 1:
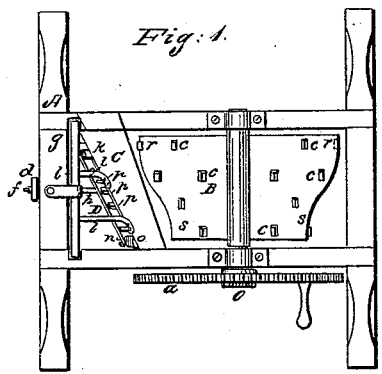
Figure 2:
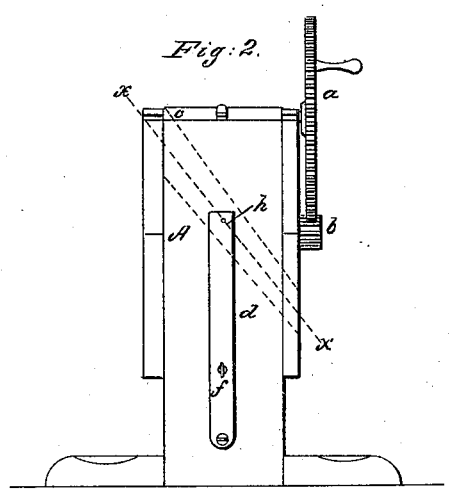
Figure 3:
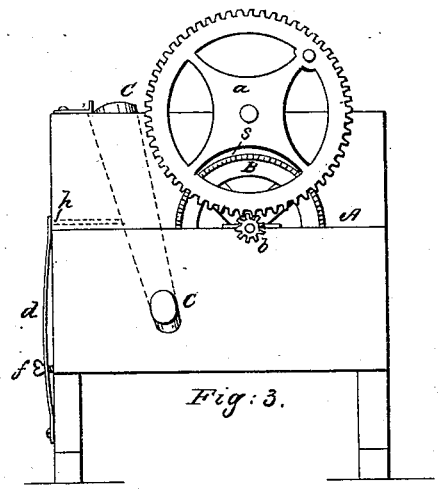
Figure 4:
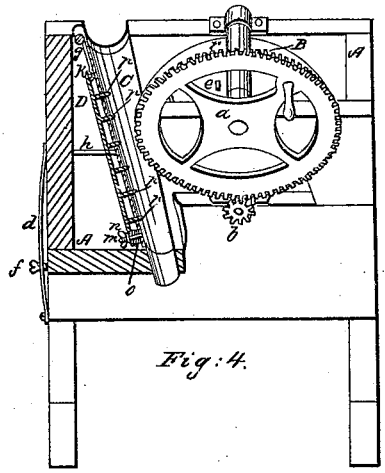

Figure 1, being a plan of my improved corn-sheller; Fig. 2, a front elevation thereof; Fig. 3, a side elevation thereof; Fig. 4, a view in perspective, showing also a section through a portion of the machine, in the plane indicated by the line $x$ $x$, Fig. 2, and exhibiting more particularly the arrangement of the ear-holder.

Like letters designate corresponding parts in all the figures.

A suitable frame A, is provided, in which are mounted the working parts of the machine, consisting of a shelling-wheel B, the periphery of which is of ogee form in its axial section, that is, having a convex surface $r$, of larger, and a concave surface $s$, of smaller, circumference; and of an ear-holder C, provided with a device for regulating the passage of the ears of corn down through it, and also to assist in shelling, as will presently be described.

The shelling-wheel is situated on a horizontal shaft, and is actauted in any convenient way; that represented in the drawings being by a pinion $b$, on its shaft, gearing into a cog-wheel $a$, which is turned by a winch or handle. The periphery of the shelling-wheel is provided with teeth $c$, $c$, in any usual manner. The ear-holder C, is situated obliquely across the frame A, to suit the position and shape of the shelling-wheel, as clearly represented in the drawings; and may be supported by a rock-shaft $g$, resting in the opposite sides of the frame, and connected with said ear-holder by rods $l$, $l$; or in any other convenient way. In order to give elasticity to the ear-holder, I usually connect it with a spring $d$, on the front of the frame, by means of a rod $h$, substantially as represented in Fig. 4; and the spring is made more or less rigid by a thumb-screw $f$. Any equivalent device for giving elasticity to the ear-holder may be employed.

The convex surface of the shelling-wheel, being of greater circumference than the concave surface, moves with a greater velocity; and the ears of corn being fed in at the upper end of the oblique ear-holder, are more rapidly turned around by said convex surface during the first part of the shelling, when most needed, than in the latter part, when the grains are nearly all stripped off. The outer edge of the convex surface being rounded, facilitates the entrance of the ears of corn into the ear-holder; while the opposite, outer edge of the concave surface turning outward, and reaching more closely to the ear-holder, strips the tips of the ears, and removes all the grains remaining thereon. The oblique situation of the ear-holder allows the ears to traverse the whole width of the shelling-wheel; and the position of the ears therein is such, (between a horizontal and vertical position,) that a suitable revolving movement is given to them, while, at the same time, they are fed down endwise as fast as required.

In shelling corn that is not perfectly dry, such, for instance, as that recently gathered from the field, it is necessary that the ears should pass more slowly through the ear-holder than when the corn is dryer. To accomplish this variation, a row of pointed teeth $p$, $p$, is arranged at suitable distances apart, in the longitudinal line of the ear-holder, as represented in Fig. 4. These teeth are made adjustable, in and out, to suit the different conditions of the corn to be shelled; and thus arranged, they also assist in shelling. They may be adjusted by any convenient or desirable means; in the drawings, they are represented as passing through the rear of the ear-holder, and secured to a bar D, parallel, or nearly so, with the ear-holder, the upper end being hinged at $k$, and the lower end thereof sliding over a screw-bolt $m$, on the end of which is a thumb-screw $n$; and with a coiled spring $o$, between said bar and ear-holder, to keep the bar pressed outward against the thumb-screw.

What I claim as my invention and desire to secure by Letters Patent, is—

The combination of the ogee-shaped shelling wheel B, with the ear-holder C, provided with the adjustable teeth $p$, $p$, the several parts constructed, arranged, and operating substantially in the manner and for the purpose herein set forth.

In witness that the above is a true specification of my improved corn sheller, I hereunto set my hand this 10th day of January, 1860.

J. P. SMITH.

Witnesses:
 JESSE B. HUMMEL,
 J. SMITH.